United States Patent
Park

(10) Patent No.: US 9,061,710 B2
(45) Date of Patent: Jun. 23, 2015

(54) REAR PILLAR APPARATUS FOR VEHICLE

(71) Applicants: Hyundai Motor Company, Seoul (KR); Kia Motors Corporation, Seoul (KR)

(72) Inventor: Hyun Jun Park, Incheong (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 13/718,927

(22) Filed: Dec. 18, 2012

(65) Prior Publication Data

US 2014/0062138 A1    Mar. 6, 2014

(30) Foreign Application Priority Data

Aug. 29, 2012    (KR) .......................... 10-2012-0095020

(51) Int. Cl.
*B62D 25/04* (2006.01)

(52) U.S. Cl.
CPC ...................................... *B62D 25/04* (2013.01)

(58) Field of Classification Search
CPC ........................................................ B62D 25/04
USPC ............................ 296/193.06, 193.08, 187.11
See application file for complete search history.

(56) References Cited

U.S. PATENT DOCUMENTS

2008/0007093 A1 *  1/2008  Andou et al. ............ 296/193.08
2011/0309657 A1    12/2011 Hutter et al.

FOREIGN PATENT DOCUMENTS

| JP | 11-129932 A | | 5/1999 |
|---|---|---|---|
| JP | 2001-63622 A | | 3/2001 |
| JP | 2002-29450 A | | 1/2002 |
| JP | 2003127900 A | * | 5/2003 |
| JP | 2005-161890 A | | 6/2005 |
| JP | 2008-18735 A | | 1/2008 |
| JP | 2010-247612 A | | 11/2010 |
| KR | 20-0188442 Y1 | | 7/2000 |
| KR | 10-2008-0021910 A | | 3/2008 |

* cited by examiner

*Primary Examiner* — Glenn Dayoan
*Assistant Examiner* — Melissa A Black
(74) *Attorney, Agent, or Firm* — Morgan, Lewis & Bockius LLP

(57) ABSTRACT

A rear pillar apparatus for a vehicle may include a rear pillar supporting a rear quarter of the vehicle, and a reinforcement member mounted on the rear pillar, wherein the rear pillar has a support vertically supporting the rear quarter, a door-upper portion configured to support a roof between a door and the roof, a rear end extending from the support and connected with a rear side of a vehicle body, and a glass seat formed between the door-upper portion and the rear end configured to mount a rear glass, and wherein the reinforcement member includes an upper reinforcement member integrally mounted on the door-upper portion, the glass seat, and the rear end, in a longitudinal direction of the vehicle body, and a vertical reinforcement member mounted on the support and connected to the upper reinforcement member.

14 Claims, 4 Drawing Sheets

REAR PILLAR APPARATUS FOR VEHICLE

CROSS-REFERENCE TO RELATED APPLICATION

The present application claims priority to Korean Patent Application No. 10-2012-0095020 filed on Aug. 29, 2012, the entire contents of which is incorporated herein for all purposes by this reference.

BACKGROUND OF THE INVENTION

1. Field of the Invention

The present invention relates to a rear pillar apparatus for a vehicle. More particularly, the present invention relates to a rear pillar apparatus for a vehicle which has improved rigidity of the frame.

2. Description of Related Art

In general, the vehicle body is fabricated in the first step of the process of manufacturing the vehicle. Further, the vehicle body is carried to a body factory after panels are produced through various presses and the panels are assembled, thereby producing a BIW (body in white).

The BIW is a frame of a vehicle which is manufactured by welding panels, without detachable doors, a hood, a power train, and chassis, and is not colored. The frame of a vehicle includes pillars that function as a supports.

The pillars are part of the frame of a vehicle, supporting the roof. Further, the pillars fall into a front pillar, a center pillar, and rear pillar, sequentially from the front of the vehicle. The front pillar, center pillar, and rear pillar are also called an A pillar, a B pillar, and a C pillar, respectively, and the rear pillar is also called a quarter pillar. Meanwhile, the rear part of a vehicle body with a rear pillar is called a rear quarter.

Recently, the interest in traveling performance and ride comfort of vehicles are increasing. It is necessary to improve rigidity of the frame of vehicles in order to improve the traveling performance and ride comfort.

That is, the frame of vehicles may deform in accordance with the driving situations of the vehicles and the deformation may have a bad influence on the traveling performance and ride comfort. Therefore, researches for improving responsiveness for minimizing the amount of deformation of a frame and returning the frame have been actively conducted. Rigidity means a property representing strength of an object that does not change in shape or volume, even if pressure is applied to the object. That is, rigidity is resistance against deformation due to load. It is possible to minimize the amount of deformation of a frame and to improve responsibility for returning a deformed frame, by increasing rigidity of the frame.

Meanwhile, as a result of examining deformation of a frame according to traveling situations of a vehicle, it was found that the rear pillar (C pillar) deformed, when the driving system moves at the front part of the vehicle.

Therefore, it is required to increase rigidity of the rear pillar, in order to minimize the amount of deformation of the rear pillar and improve responsibility for returning the deformed rear pillar.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear pillar apparatus for a vehicle having advantages of having increased rigidity by being equipped with a reinforcement member.

In an aspect of the present invention, a rear pillar apparatus for a vehicle may include a rear pillar supporting a rear quarter of the vehicle, and a reinforcement member mounted on the rear pillar, wherein the rear pillar has a support vertically supporting the rear quarter, a door-upper portion configured to support a roof between a door and the roof, a rear end extending from the support and connected with a rear side of a vehicle body, and a glass seat formed between the door-upper portion and the rear end configured to mount a rear glass, and wherein the reinforcement member may include an upper reinforcement member integrally mounted on the door-upper portion, the glass seat, and the rear end, in a longitudinal direction of the vehicle body, and a vertical reinforcement member mounted on the support and connected to the upper reinforcement member.

The vertical reinforcement member and the upper reinforcement member are connected in a T-shaped joint structure.

The vertical reinforcement member and the upper reinforcement member are integrally formed.

Cross-sections of the vertical reinforcement member and the upper reinforcement member are formed in U-shapes.

The cross-sections of the vertical reinforcement member and the upper reinforcement member form a box beam structure with four sides closed, with openings of the U-shapes being connected with the rear pillar.

The upper reinforcement member is in contact with the rear end at least at two points and spot-welded.

The upper reinforcement member is in contact with a lamp housing formed at the rear end of the rear pillar.

Two rear pillars are formed at both sides in a transverse direction of the vehicle body, wherein a horizontal panel horizontally connects the two rear pillars, and wherein a horizontal reinforcement member is mounted on the horizontal panel and connected with the upper reinforcement member.

The upper reinforcement member and the vertical reinforcement member are mounted on an outer side of the rear pillar.

The rear pillar apparatus may further include an inside reinforcement member mounted on an inner side of the rear pillar, wherein the inside reinforcement member extends to the rear end of the rear pillar.

In another aspect of the present invention, a rear pillar apparatus for a vehicle may include two rear pillars supporting a rear quarter of the vehicle, a horizontal panel horizontally connecting the two rear pillars, and a reinforcement member mounted on the rear pillar and the horizontal panel, wherein the rear pillar has a door-upper portion configured to support a roof between a door and the roof, a rear end extending from a support vertically supporting the rear quarter and connected with a rear side of a vehicle body, and a glass seat formed between the door-upper portion and the rear end configured to mount a rear glass, and wherein the reinforcement member may include an upper reinforcement member integrally mounted on the door-upper portion, the glass seat, and the rear end, in a longitudinal direction of the vehicle body, and a vertical reinforcement member mounted on the horizontal panel.

A longitudinal portion of the upper reinforcement member is connected with a longitudinal portion of the horizontal reinforcement member.

The upper reinforcement member and the horizontal reinforcement member are connected by a connection portion, wherein cross-sections of the upper reinforcement member and the horizontal reinforcement member are formed in U-shapes.

The cross-sections of the vertical reinforcement member and the upper reinforcement member form a box beam structure with four sides closed, with openings of the U-shapes being connected with the rear pillar and the horizontal panel.

The horizontal reinforcement member extends up to where a lower end of the rear glass extends, to increase combination strength for combining the rear glass with the vehicle body.

The upper reinforcement member is mounted on an outer side of the rear pillar.

The rear pillar apparatus may further include an inside reinforcement member mounted on an inner side of the rear pillar, wherein the inner reinforcement member extends to a rear end of the rear pillar.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
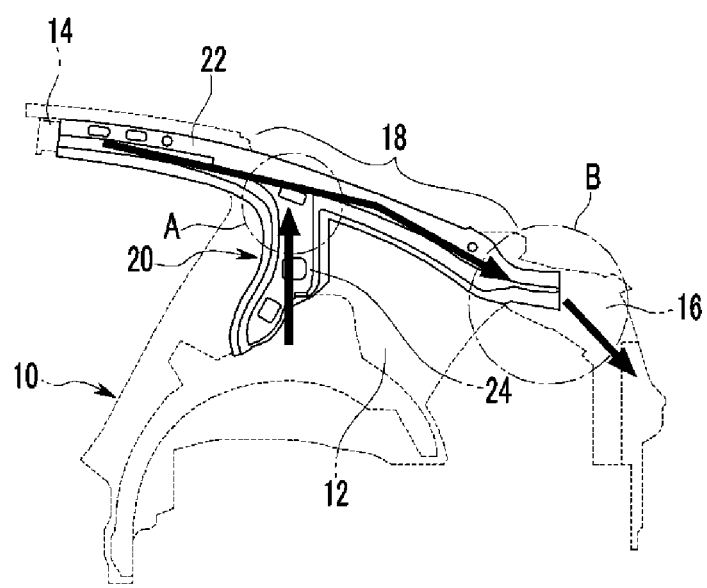
FIG. 1 is a view showing the outside of a rear pillar apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Meanwhile, the frame of a vehicle is indicated by dotted lines and reinforcement members (stiffening member) are indicated by solid lines in the drawings that are referred herein.

FIG. 1 is a view showing the outside of a rear pillar apparatus for a vehicle according to an exemplary embodiment of the present invention.

As shown in FIG. 1, a rear pillar apparatus 10 for a vehicle according to an exemplary embodiment of the present invention is formed by mounting a reinforcement member 20 on a rear pillar 10. The transmission path of a force that is transmitted to the rear pillar 10 is indicated by arrows in FIG. 1.

The rear pillar 10 has a support 12, a door-upper portion 14, a rear end 16, and a glass seat 18, which are integrally formed.

The support 12 is a column vertically supporting the vehicle body, in the rear quarter of the vehicle body. The rear quarter is defined as the rear portion of the vehicle body herein where the rear pillar 10 is formed in the frame of a vehicle.

The door-upper portion 14 extends from the support 12 to support a roof between the roof and a door of a vehicle. That is, a space where the door is mounted is formed above the door-upper portion 14 and the roof is connected to the top of the door-upper portion 16.

The rear end 16 extends from the support 12 to be connected with the rear side of a vehicle.

The glass seat 18 is formed between the door-upper portion 14 and the rear end 16, above the support 12. Further, the glass seat 18 is where a rear glass of a vehicle is mounted. That is, the glass seat 18 is formed to support the side of the rear glass. However, since the space where the rear glass is mounted is formed on the frame of a vehicle, the glass seat 18 may reduce in rigidity. Therefore, the rear pillar apparatus for a vehicle according to an exemplary embodiment of the present invention increases the rigidity of the glass seat 18.

The reinforcement member 20 includes an upper reinforcement member 22 and a vertical reinforcement member 24.

The upper reinforcement member 22 is mounted on the door-upper portion 14, the glass seat 18, and the rear end 16 of the rear pillar 10. Further, the upper reinforcement member 22 extends from the door-upper portion 14 of the rear pillar 10 to the rear end 16 through the glass seat 18. That is, the upper reinforcement member 22 mounted on the door-upper portion 14, the glass seat 18, and the rear end 16 may be integrally formed. Therefore, a force that transmitted from the front to the rear of a vehicle has an increased transmission path and is easily distributed.

The vertical reinforcement member 24 is mounted on the support 12 and connected to the upper reinforcement member 22. That is, the vertical reinforcement member 24 and the upper reinforcement member 22 are connected in a T-shaped joint structure. "A" in FIG. 1 indicates the T-shaped joint. Further, the vertical reinforcement member 24 and the upper reinforcement member 22 may be integrally formed. Therefore, a force that is transmitted upward from the bottom of the vehicle body is transmitted to the upper reinforcement member 22 through the vertical reinforcement member 24 and easily distributed.

The T-shaped joint structure is a structure that can provide a firm and strong integral frame with torsion minimized and apparent to people of an ordinary skill in the art (hereafter, those skilled in the art), such that the details are not described.

The vertical reinforcement member 24 and the upper reinforcement member 22 have a U-shaped transverse cross-section and the opening of the U-shape is mounted on the rear pillar 10, thereby forming a box beam structure with four sides closed. The box beam structure may have rigidity higher than a panel structure.

Figure 2:
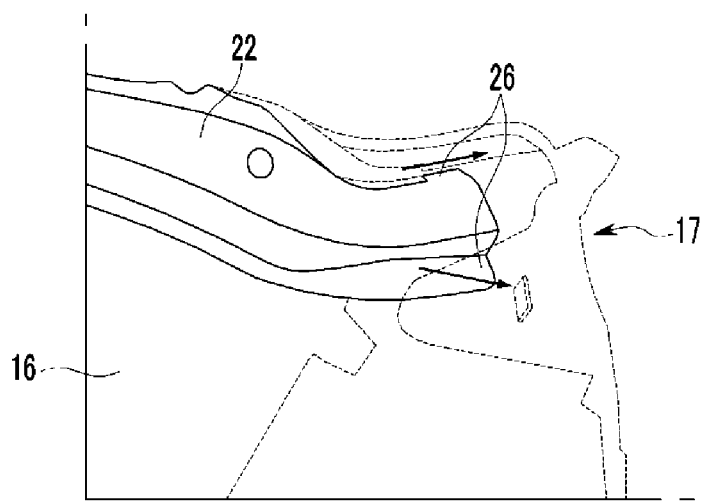
FIG. 2 is a perspective view enlarging the portion B of FIG. 1.

FIG. 2 is a perspective view enlarging the portion B of FIG. 1.

As shown in FIG. 2, the upper reinforcement member 22 extending to the rear end 16 of the rear pillar 10 has a contact portion 26.

The contact portion 26 is in contact with a lamp housing 17 formed at the rear end 16 of the rear pillar 10. Further, the upper reinforcement member 22 has at least two or more contact portions 26.

The lamp housing 17 is formed at the rear pillar 10 to receive a rear lamp of a vehicle, that is, the lamp housing 17 has a space to mount a rear lamp in.

The contact portion 26 is brought in contact with the inner side of the lamp housing 17 and then spot-welded. Further, the force that is transmitted from the front to the rear of the vehicle body is easily transmitted to the rear end 16 of the rear pillar 10 by the spot-welded contact portion 26 and distributed to two or more contact portions 26.

The transmission path of a force distributed to two or more contact portions 26 is indicated by arrows in FIG. 2. Although two contact portions 26 are shown in FIG. 2, the present invention is not limited thereto.

Figure 3:
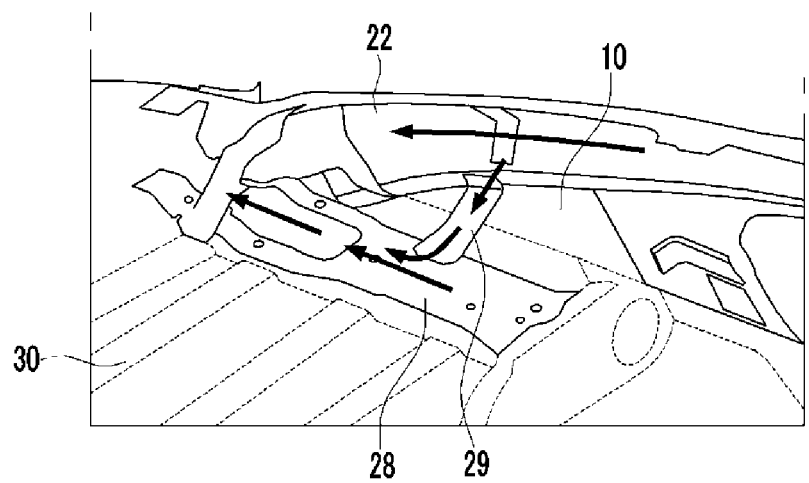
FIG. 3 is a perspective view showing the inside of the rear pillar apparatus for a vehicle according to an exemplary embodiment of the present invention.

FIG. 3 is a perspective view showing the inside of the rear pillar apparatus for a vehicle according to an exemplary embodiment of the present invention.

As shown in FIG. 3, the rear pillar apparatus for a vehicle according to an exemplary embodiment of the present invention further includes a horizontal panel 30. Further, the reinforcement member 20 further includes a horizontal reinforcement member 28.

The horizontal panel 30 connects two rear pillars 10, which form the frame of a vehicle, horizontally inside. Further, the frame of a vehicle includes a plurality of horizontal panels 30. Meanwhile, a horizontal panel 30 disposed close to a rear glass seat is shown in FIG. 3.

The horizontal reinforcement member 28 is mounted on the horizontal panel 30. Further, the horizontal reinforcement member 28 is mounted on the underside of the horizontal panel 30, near the rear pillar 10. Further, the horizontal reinforcement member 28 is formed to be long in the longitudinal direction of the vehicle body and extends up to where the lower end of the rear glass is mounted. The horizontal reinforcement member 28 extending up to where the lower end of the rear glass is mounted can increase the combination strength of the rear glass combined with the frame of a vehicle.

Further, the horizontal reinforcement member 28 has a reinforcement connection portion 29.

The reinforcement connection portion 29 connects a longitudinal portion of the horizontal reinforcement member 28 with a longitudinal portion of the upper reinforcement member 22. That is, the reinforcement connection portion 29 extends through a portion of the horizontal panel 30 from the horizontal reinforcement member 28, and is connected to a portion of the upper reinforcement member 22 through a portion of the rear pillar 10. A force that is transmitted to the upper reinforcement member 22 can be distributed through the reinforcement connection portion 29. The transmission path of the force is indicated by arrows in FIG. 3.

Figure 4:
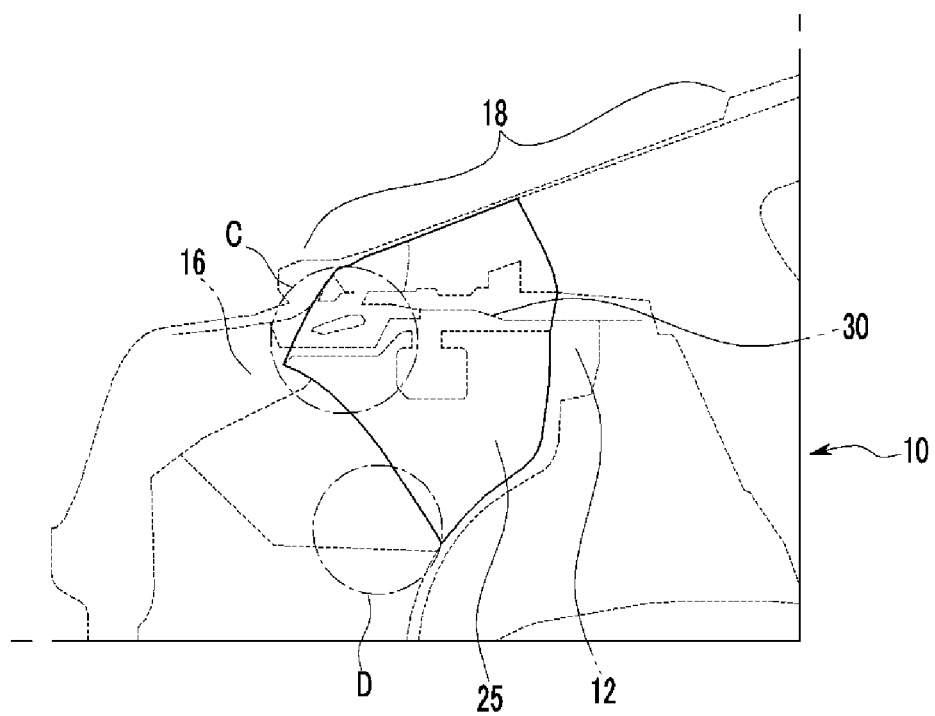
FIG. 4 is a view showing the inside of the rear pillar apparatus for a vehicle according to an exemplary embodiment of the present invention.

FIG. 4 is a view showing the inside of the rear pillar apparatus for a vehicle according to an exemplary embodiment of the present invention.

As shown in FIG. 4, the reinforcement member 20 according to an exemplary embodiment of the present invention includes an inside reinforcement member 25.

The inside reinforcement member 25 is mounted on the inner side of the rear pillar 10. Further, the inside reinforcement member 25 extends down from the glass seat 18 of the rear pillar 10 to the support 12, and horizontally extends to the rear end 16 of the rear pillar 10. Further, the inside reinforcement member 25 maximally extends to the rear end 16 and the portion extending to the support 12 is minimized, such that it is possible to optimally distribute the force that is transmitted to the rear pillar 10.

The portion "C" in FIG. 4 is a portion of the inside reinforcement member 25 increased in comparison to the related art, and the portion "D" is a portion with the inside reinforcement member 25 removed in comparison to the related art. The increase or removal of the inside reinforcement member 25 may be set by those skilled in the art such that the force that is transmitted to the rear pillar 10 can be optimally distributed.

As described above, according to an exemplary embodiment of the present invention, as the reinforcement member 20 with an improved structure is mounted on the rear pillar 10 of a vehicle, rigidity of the rear pillar 10 can be increased. Further, as the rigidity of the rear pillar 10 increases, traveling performance and ride comfort of a vehicle can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear pillar apparatus for a vehicle comprising:
  a rear pillar supporting a rear quarter of the vehicle; and
  a reinforcement member mounted on the rear pillar,
  wherein the rear pillar has:
    a support vertically supporting the rear quarter;
    a door-upper portion configured to support a roof between a door and the roof;
    a rear end extending from the support and connected with a rear side of a vehicle body; and
    a glass seat formed between the door-upper portion and the rear end configured to mount a rear glass,
  wherein the reinforcement member includes:
    an upper reinforcement member extending to the rear end of the rear pillar and integrally mounted on the door-upper portion, the glass seat, and the rear end, in a longitudinal direction of the vehicle body; and a vertical reinforcement member mounted on the support and connected to the upper reinforcement member;

wherein the upper reinforcement member is in contact with the rear end of the rear pillar at least at two points and spot-welded and is in contact with a lamp housing and spot-welded thereto, wherein two rear pillars are formed at both sides in a transverse direction of the vehicle body, wherein a horizontal panel horizontally connects the two rear pillars, and wherein a horizontal reinforcement member is mounted on the horizontal panel and connected with the upper reinforcement member.

2. The rear pillar apparatus of claim 1, wherein the vertical reinforcement member and the upper reinforcement member are connected in a T-shaped joint structure.

3. The rear pillar apparatus of claim 1, wherein the vertical reinforcement member and the upper reinforcement member are integrally formed.

4. The rear pillar apparatus of claim 1, wherein cross-sections of the vertical reinforcement member and the upper reinforcement member are formed in U-shapes.

5. The rear pillar apparatus of claim 4, wherein the cross-sections of the vertical reinforcement member and the upper reinforcement member form a box beam structure with four sides closed, with openings of the U-shapes being connected with the rear pillar.

6. The rear pillar apparatus of claim 1, wherein the upper reinforcement member is in contact with the lamp housing formed at the rear end of the rear pillar.

7. The rear pillar apparatus of claim 1, wherein the upper reinforcement member and the vertical reinforcement member are mounted on an outer side of the rear pillar.

8. The rear pillar apparatus of claim 1, further comprising an inside reinforcement member mounted on an inner side of the rear pillar, wherein the inside reinforcement member extends to the rear end of the rear pillar.

9. A rear pillar apparatus for a vehicle comprising:
two rear pillars supporting a rear quarter of the vehicle;
a horizontal panel horizontally connecting the two rear pillars; and
a reinforcement member mounted on the rear pillar and the horizontal panel, wherein the rear pillar has:
a door-upper portion configured to support a roof between a door and the roof;
a rear end extending from a support vertically supporting the rear quarter and connected with a rear side of a vehicle body; and
a glass seat formed between the door-upper portion and the rear end configured to mount a rear glass, and
wherein the reinforcement member includes:
an upper reinforcement member extending to the rear end of the rear pillar and integrally mounted on the door-upper portion, the glass seat, and the rear end integrally mounted on the door-upper portion, the glass seat, and the rear end, in a longitudinal direction of the vehicle body and spot-welded to a lamp housing; and
a vertical reinforcement member mounted on the horizontal panel;
wherein a horizontal reinforcement member extends up to where a lower end of the rear glass extends, to increase combination strength for combining the rear glass with the vehicle body.

10. The rear pillar apparatus of claim 9, wherein a longitudinal portion of the upper reinforcement member is connected with a longitudinal portion of the horizontal reinforcement member.

11. The rear pillar apparatus of claim 10,
wherein the upper reinforcement member and the horizontal reinforcement member are connected by a connection portion, and
wherein cross-sections of the upper reinforcement member and the horizontal reinforcement member are formed in U-shapes.

12. The rear pillar apparatus of claim 11, wherein the cross-sections of the vertical reinforcement member and the upper reinforcement member form a box beam structure with four sides closed, with openings of the U-shapes being connected with the rear pillar and the horizontal panel.

13. The rear pillar apparatus of claim 9, wherein the upper reinforcement member is mounted on an outer side of the rear pillar.

14. The rear pillar apparatus of claim 9, further comprising an inside reinforcement member mounted on an inner side of the rear pillar, wherein
the inner reinforcement member extends to a rear end of the rear pillar.

* * * * *